(No Model.) 3 Sheets—Sheet 2.
J. F. STEWARD.
MOWING MACHINE.
No. 408,050. Patented July 30, 1889.
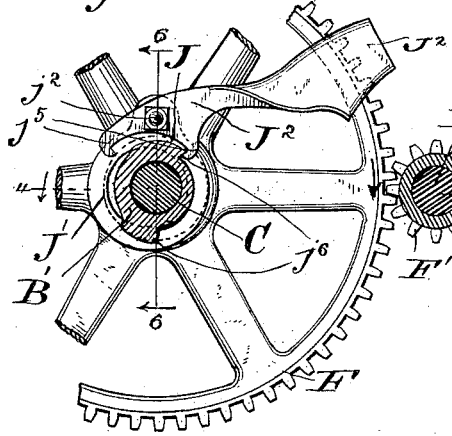
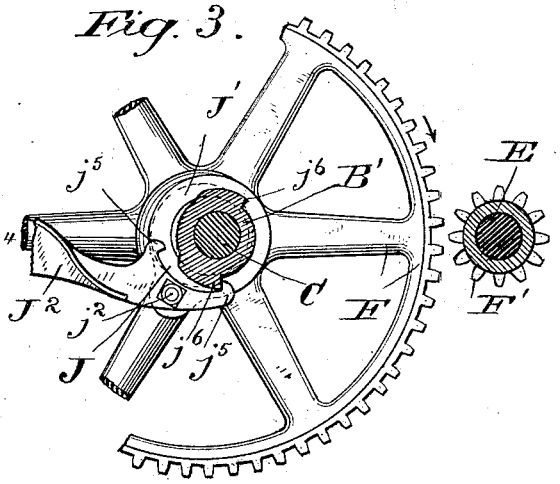
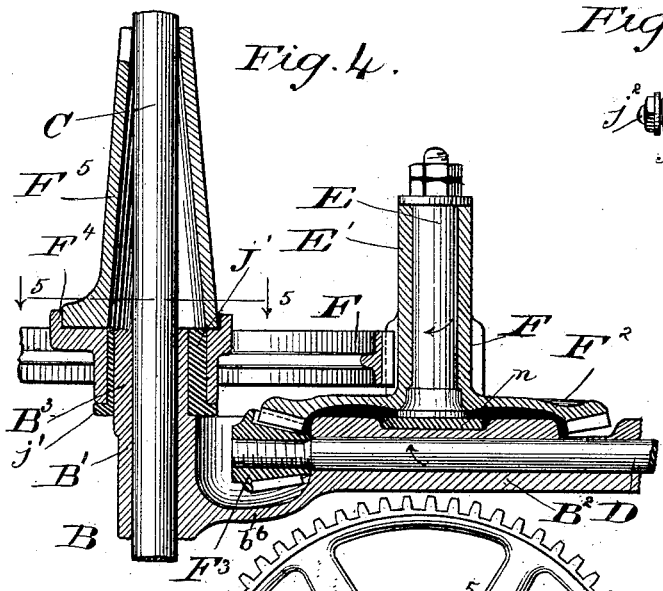
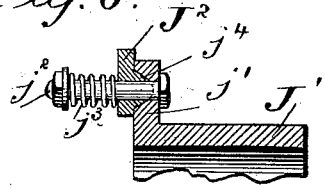
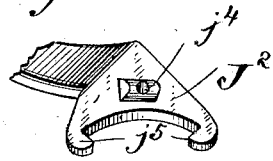
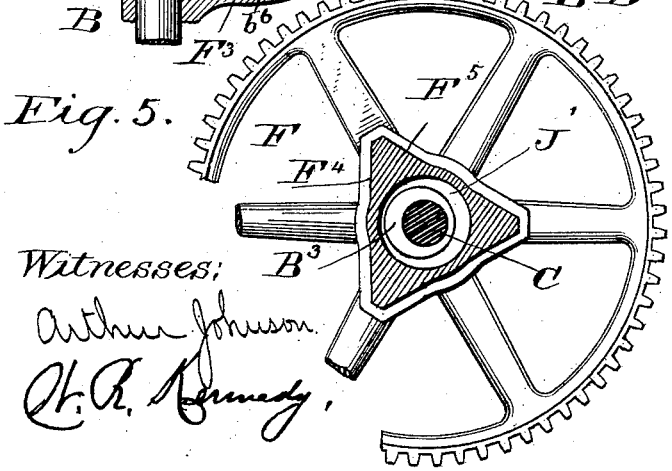
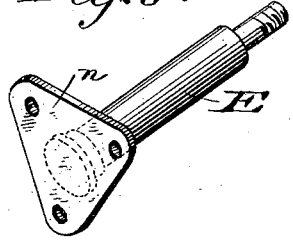
Witnesses:
Arthur Johnson
H. R. Kennedy
Inventor:
John F. Steward
By his Atty.
P. T. Dodge (No Model.) 3 Sheets—Sheet 3.
J. F. STEWARD.
MOWING MACHINE.
No. 408,050. Patented July 30, 1889.
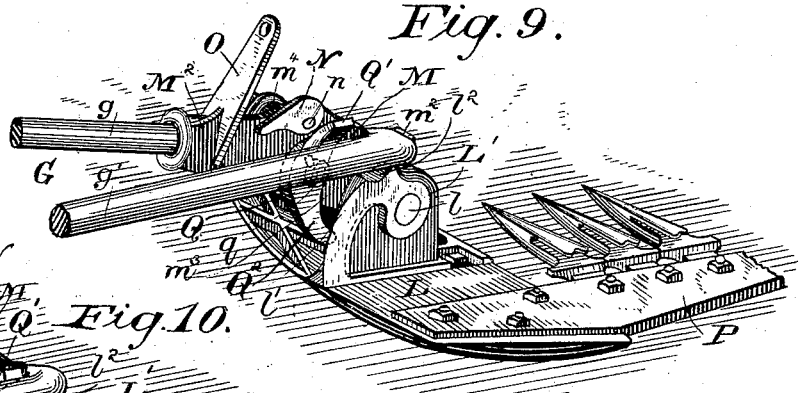
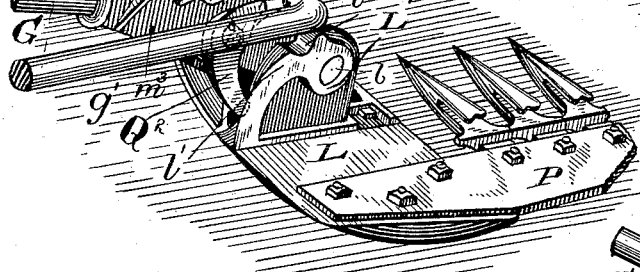
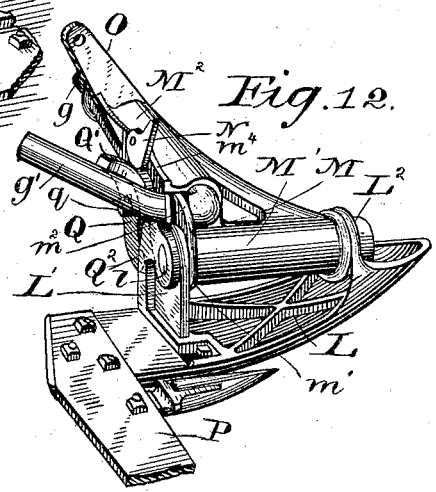
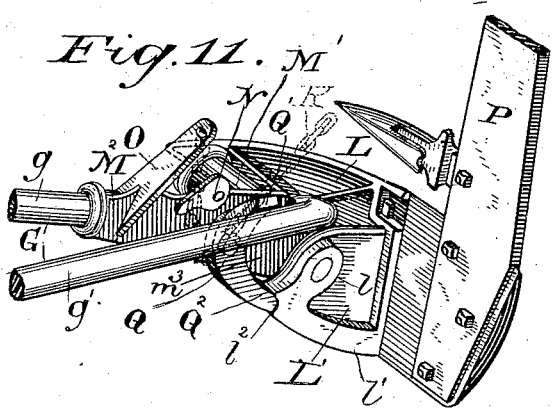
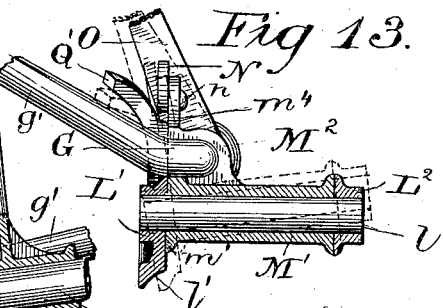
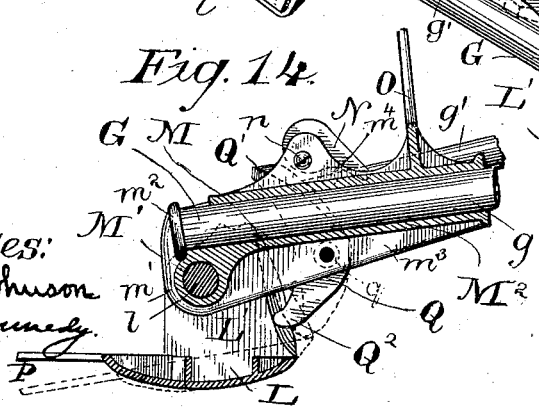
Witnesses:
Arthur Johnson
H. R. Kennedy
Inventor:
John F. Steward
By his Atty,
P. T. Dodge

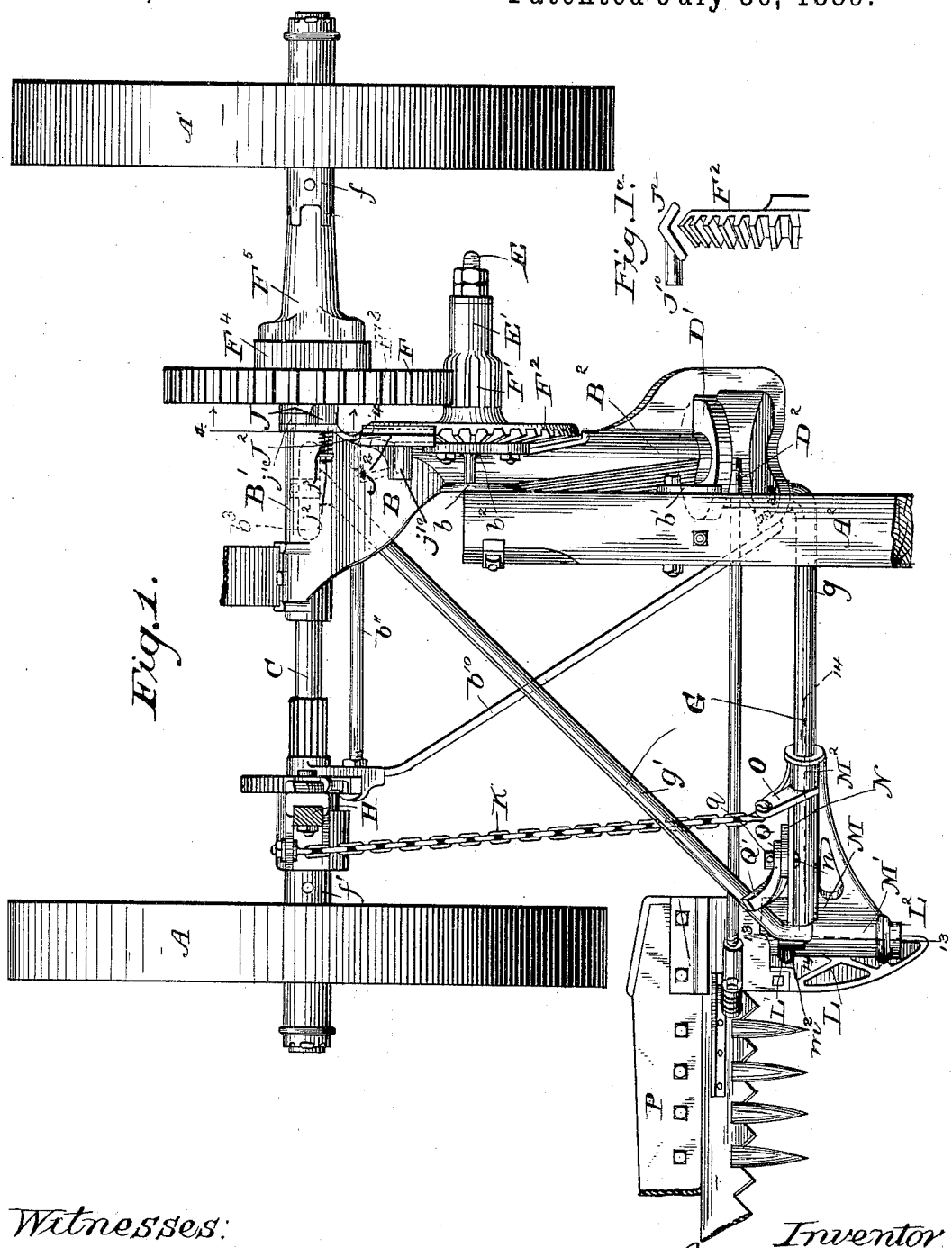

UNITED STATES PATENT OFFICE.

JOHN F. STEWARD, OF CHICAGO, ILLINOIS.

MOWING-MACHINE.

SPECIFICATION forming part of Letters Patent No. 408,050, dated July 30, 1889.

Application filed September 25, 1888. Serial No. 286,348. (No model.)

*To all whom it may concern:*

Be it known that I, JOHN F. STEWARD, a citizen of the United States, residing at Chicago, in the county of Cook and State of Illinois, have invented certain new and useful Improvements in Mowing-Machines, of which the following is a specification, reference being had to the accompanying drawings, forming a part hereof.

My invention relates, first, to improvements in the gearing for transmitting motion to the knife; and, second, to improvements in the jointed connection between the finger-bar and the frame.

In order that my improvements may be clearly understood, I have represented the same as applied to a complete mowing-machine, which is not of my individual invention, except as regards the matters hereinafter specifically described and claimed.

In the accompanying drawings, Figure 1 is a top plan view of the machine, the upper end of the finger-bar, the seat, and the forward end of the pole being broken away. Fig. 1ª is a front view showing one of the gear-wheels and the lever forming a guard thereover. Figs. 2 and 3 are vertical sections on the lines 2 2 of Fig. 1, the former showing the gearing in an operative and the latter showing it in an inoperative or disconnected position. Fig. 4 is a horizontal section through the driving-gear, on the line 4 4 of Fig. 2. Fig. 5 is a vertical section through a portion of the driving-gear, on the line 5 5 of Figs. 1 and 4. Fig. 6 is a vertical section on the line 6 6 of Fig. 2. Fig. 7 is a perspective view of a portion of the shifting-lever. Fig. 8 is a perspective view of the stud or journal for one of the driving-gears. Fig. 9 is a perspective view from the rear of the main shoe, the coupling-frame and attendant parts in their normal position. Fig. 10 is a similar view showing the finger-bar tilted. Fig. 11 is a similar view with the finger-bar folded. Fig. 12 is a perspective view of the same parts, looking from the outer end of the finger-bar. Fig. 13 is a vertical section through the hinge-piece which sustains the finger-bar, showing also adjacent parts in the position which they occupy when the finger-bar is tilted, but not folded, the section being taken on the line 13 13 of Fig. 1. Fig. 14 is a vertical section on the line 14 14 of Fig. 1.

Referring to the drawings, A and A' are the main driving-wheels, mounted on opposite ends of the axle C.

B is the main frame, formed at the rear end with a sleeve B', through which the axle passes, and also formed with a longitudinal bearing B² for the shaft of the crank-wheel D', and with upright lugs $b$, $b'$, and $b^2$. The frame is stiffened and held in position by means of a diagonal brace $b^{10}$, extending rearward from its forward end to a sleeve on the opposite end of the axle and by a cross-brace $b^{11}$, this brace forming, however, no part of my invention. The tongue A² is bolted to the flanges $b$ $b'$ of the main frame.

The crank-wheel D, for driving the knife, is located at the forward end of the frame, as usual, and its supporting-shaft D extended rearward and provided in the rear extremity, as shown in Figs. 1 and 4, with a beveled driving-pinion F³, which latter receives motion from a gear F², formed integral with the spur-pinion F', which in turn receives motion from a large spur-gear F, revolving around the main axle and receiving motion, as hereinafter explained, from the ground-wheels. The gear F² and its pinion F' are supported on a rigid journal or stud E, formed, as shown in Fig. 8, with a flange $n$, which is firmly bolted, as shown in Fig. 1, to the flange $b^2$ on the main frame.

The first part of my invention relates to the means for imparting motion from the ground-wheels to the gear F and for throwing said gear into and out of engagement with the driving-pinion F'. The construction to this end is plainly shown in Figs. 1 to 5. The gear F is mounted on and turns freely around a sleeve J', which has its central opening or bore eccentric to its periphery. This eccentric sleeve is in turn mounted and arranged to turn upon a hub B³, projected outward from the main frame and having its periphery eccentric to the axle. The two sleeves have an equal eccentricity, so that by turning the outer sleeve J', which carries the gear-wheel around the eccentric hub on the frame, I am enabled to bring the gear F into a position concentric with the axle and into engagement with the pinion F', as shown in Figs. 1 and 2, or, on the other hand, to throw the gear F bodily backward out of engagement with the pinion F' to a position eccentric to the axle.

In practice I find that the best results are obtained when the eccentrics are proportioned and arranged as above described—that is to say, so that the gear F is exactly concentric with the main axle when in operative position; but this coincidence of the axes is not essential, as the parts will operate satisfactorily, although the gear F may be somewhat eccentric to the axle when in operation.

For the purpose of turning and locking the eccentric gearing supporting-sleeve J', I may employ devices of any appropriate character, but I recommend the construction herein shown, in which $J^2$ represents a lever pivoted at $j^2$ to a lug on the side of the sleeve J' and formed at its inner end on opposite sides of the pivot with two lips $j^5$. The main frame is provided on opposite sides of the axle with two shoulders $j^6$, which may be engaged alternately by the respective lips $j^5$ of the lever. When the lever is thrown forward, as in Fig. 2, it revolves the sleeve until the gear is thrown into action, whereupon the forward lip $j^5$, engaging the upper shoulder $j^6$, holds the part in operative position, as shown in Fig. 2. On reversing the motion of the lever the first effect is to disengage the lip from the shoulder and thereby release the sleeve, after which the continued motion of the lever rotates the sleeve until the gear is disengaged and the other lip of the lever engaged with the lower shoulder $j^6$, as shown in Fig. 3, so as to hold the gear out of engagement.

To prevent accidental movement of the lever, it is provided on one side, as shown in Fig. 7, with a transverse rib $j^4$, to enter a corresponding recess in the supporting-flange, as shown in Fig. 6, the parts being urged together to cause the seating of the flange by a spring $j^3$, mounted upon the lever-pivot $j^2$, acting against the side of the lever, as shown in Figs. 1 and 6. The forward end of the lever is so shaped as to form a guard for the periphery of the gear $F^2$, and it is provided on one side, as shown in Figs. 1 and 1ª, with a lateral projection $j^{10}$, so that it may be conveniently operated by the foot of the driver.

The gear F may be driven from the ground-wheels through intermediate connections of any suitable character; but I strongly recommend the peculiar devices represented in the drawings, in which $F^5$ represents an internally-tapered sleeve mounted loosely around the main axle and provided at one end with a triangular flange or enlargement, seated in a corresponding cavity $F^4$ in the outer side of the gear F. At the opposite or outer end the sleeve $F^5$ is provided with teeth, which interlock with a hub or collar $f$ on the axle. The hub $f$ is commonly pinned to the axle. Either or both of the wheels may be fastened rigidly to the axle, but I commonly employ intermediate ratchet connections, such as are used at the present day in all machines of this class. Owing to the conical or flaring shape of the sleeve in its interior, it is enabled to tip upon the shaft in such manner as to admit of the movement of the gear F forward and backward. It forms in effect a flexible connection between the gear F and the driving-collar $f$.

Passing now to the second part of my invention, attention is directed to Fig. 1 and Figs. 9 to 14. The finger-bar and knife may be of any ordinary construction, and the knife is actuated, as usual, by a pitman $D^2$, extending thence to the crank-wheel D'. The finger-bar is rigidly bolted to the inner or main shoe L, and this shoe is in turn connected by an axis lying in the line of travel to a hinge-piece M, which is in turn connected through an axis at right angles to the line of travel to a so-called "coupling-frame" G, jointed to the main frame. It is through this coupling-frame that the entire cutting mechanism is sustained and carried.

The coupling-frame may be of any suitable character, provided it is adapted to sustain the hinge-piece M and permit the rocking motion of the latter, as hereinafter described; but in the form herein shown the coupling-frame is made complete in one piece of a bar or rod bent to a V form, so as to present the two arms $g$ and $g'$. The arm $g$ is jointed in any suitable manner to the forward end of the main frame near the axis of the crank-wheel, and extends thence grassward to a point directly in front of the ground-wheel A, whence it is extended rearward and stubble-ward to the rear end of the main frame, where it terminates in a journal mounted in a lug $b^3$, depending from the frame.

The front frame $g$ corresponds to what is commonly known as the "hinge-bar" or "mower-frame," while the arm $g'$ corresponds to the ordinary thrust-bar or push-bar, its office being to prevent the cutting mechanism from swinging rearward.

The hinge-piece M is formed with a sleeve $M^2$, mounted to rock freely around the arm $g$ of the coupling-frame, and is also formed with a second sleeve M', lying below and at right angles to the first—that is to say, lying in the direction of the line of travel. This second sleeve M' is seated between lugs L' and $L^2$, rising from the main shoe, and is connected thereto by a horizontal pivot-pin $l$, as shown in the several figures. The shoe and the finger-bar turn vertically around the pivot $l$, while the entire cutting mechanism, including the shoe and hinge-piece M, rock or turn in a forward or backward direction around the arm $g$ as a center.

To effect the rocking action of the finger-bar, an arm O is extended rigidly upward from the hinge-piece M, and connected by a chain K to a lifting-lever H, suitably supported on the axle or frame. The backward movement of the lever causes the hinge-piece to rock toward the rear, thereby rocking the shoe and tipping the cutter upward at the front in a manner which will be readily understood by any person familiar with the art.

The hinge-piece M is prevented from playing endwise on the arm $g$ by means of a lug $m^2$, which rises from the hinge-piece on the outer side of the brace $g$, as shown more particularly in Figs. 1 and 14.

It is to be noted that the lug $m^2$ is of such form and in such position, with a space between it and the sleeve, that while it remains in engagement with the thrust-bar, so long as the shoe and hinge-piece are in operative position, it may be carried out of engagement by turning said parts upward and forward. It is only necessary, therefore, in assembling the parts to slide the hinge-piece endwise upon hinge-bar $g$ and then turn it down to its operative position, whereupon the stud engages automatically behind the thrust-bar to keep the hinge-piece in place.

The provision of the stud on the hinge-piece is advantageous in that it adds nothing to the cost of construction, in that it reduces the time and labor required in setting up the machine, and in that it effectually prevents the parts from rattling loose.

In order that the lifting of the inner shoe above a certain point may cause the finger-bar to rise at the outer end, I employ between the hinge-piece and shoe the peculiarly-constructed gag, which answers not only the purposes of the gags heretofore used, but also certain additional purposes, which will presently appear. My gag consists of a curved lever Q, projecting rigidly from the upper part of the hinge-piece M. The upper end $Q'$ of the gag-lever is arranged to project over the arm $g'$ of the coupling-frame, while the lower end $Q^2$ is arranged to bear against the eccentric surface $l'$ of an ear on the main shoe. When the parts are in operative position, the gag-lever is inactive. When, however, the shoe is rocked backward through the action of the controlling-lever and intermediate parts until it reaches the extreme limit of the rocking movement, the upper end of the gag-lever is thrown against the arm $g'$ and its lower end caused to act against the main shoe below the pivot $l$ in such manner as to prevent the shoe from turning on the pivot $l$, and thereby prevent the outer end of the finger-bar from falling as the cutting mechanism is raised by the lifting-chain K.

From the foregoing it will be understood that the chain acts, first, to rock the cutter; second, to cause the action of the gag-lever, and, third, to raise the shoe and cutting mechanism bodily.

The finger-bar may be turned by hand around the pivot $l$ to an upright position, as shown in Fig. 11. In order to lock it in this elevated position, the stud $l'$ of the main shoe is provided with a notch $l^2$, in which the lower end of the gag-lever engages automatically, as shown in Fig. 11, as the finger-bar reaches a vertical position. This engagement of the gag-lever is due to the fact that its upper end bears forcibly against the arm $g'$.

In the operation of mowing-machines in certain kinds of grass and under certain conditions familiar to experts in this art it is desirable to sustain and carry the outer end of the finger-bar; or, in other words, to provide a rigid connection between the finger-bar and coupling-frame, so that the outer end of the bar may not be permitted to fall. To this end I make use of the gag-lever acting against the shoe, in combination with any suitable device for locking the gag-lever in position. A very simple and efficient means for this purpose is an eccentric N, such as shown in Figs. 9, 10, and 12, pivoted to the hinge-piece M, and adapted to bear against the upper end of the gag-lever. Under ordinary circumstances this eccentric is turned to an inoperative position, as shown in Figs. 9 and 10. When, however, it is required to sustain the outer end of the finger-bar, the eccentric is turned over, as shown in Fig. 12, so as to force the outer end of the gag-lever outward, and thereby lock its lower end against the stud L of the main shoe below its pivot $l$. Thus locked, the gag-lever becomes in effect a rigid support to prevent the finger-bar from falling at the outer end around the pivot $l$ as a center.

Having thus described my invention, what I claim is—

1. In a mowing-machine, the axle, and the main frame mounted on the axle and provided with the eccentric hub surrounding the axle, in combination with the eccentric sleeve mounted to revolve on the hub, and the gear-wheel mounted to revolve on the eccentric, the eccentricity of the hub and the sleeve being approximately equal, whereby the rotation of the sleeve may be caused to adjust the gear-wheel concentric with the axle or eccentric thereto, as required.

2. In a mower, the frame having the hub $B^3$, and the axle passing eccentrically therethrough, in combination with the revoluble eccentric sleeve surrounding the hub, the gear-wheel F, revoluble on the sleeve, the pinion mounted on a fixed journal and engaging the gear-wheel, and a driving-connection between the wheel F and the axle.

3. The frame having the eccentric hub and shoulders $j^6$, in combination with the eccentric gear-sustaining sleeve mounted on the hub, and the lever pivoted to the sleeve and provided with lips $j^5$, substantially as shown, whereby the lever is adapted to turn the sleeve and lock the same.

4. In combination with the frame having shoulders $j^6$ and a cavity to receive the lever-stud, the rotary gear-sustaining sleeve mounted on the frame, the lever pivoted on the sleeve and provided with lips $j^5$, and stud $j^4$, and the spring $j^3$, acting to urge the stud into the cavity in the frame.

5. In combination with the rotary axle, the gear-wheel F, encircling the same, the intermediate eccentric sleeve to sustain and shift the gear, and the coupling sleeve $F^5$, engaged loosely at one end with the gear-wheel and at the other end with the axle-collar $f$.

6. The frame having the hub $B^3$, the axle passed eccentrically through the hub, the eccentric sleeve surrounding the hub, the gear-wheel mounted on the sleeve and provided with the angular cavity in its side, the toothed collar $f$, secured to the axle, and the conical sleeve $F^5$, mounted on the axle with one end toothed to engage the collar $f$ and the other enlarged to fit the cavity in wheel F, said elements constructed and combined substantially as described.

7. In a mowing-machine, the coupling-frame having the transverse hinge-bar $g$ and thrust-bar $g'$, in combination with the hinge-piece having the sleeve to encircle the hinge-bar, and the rigid stud $m^2$, to engage the thrust-bar, said parts constructed, as shown, with a space between the sleeve and stud to admit of the hinge-piece being carried endwise to its place and then secured by a rotary motion.

8. In a mower, the combination of the coupling-frame comprising the arms $g$ and $g'$, the hinge-piece M, journaled on the bar $g$, the main shoe connected to the hinge-piece by the fore-and-aft axis, and the gag-lever pivoted to the hinge-piece and adapted to be operated by contact with the coupling-frame as the latter is rocked upon the arm $g$.

9. In a mower, the coupling-frame having arms $g$ and $g'$, in combination with the hinge-piece M, journaled on the arm $g$ and provided with the tilting arm O, the lifting-chain connected to said arm, the lifting-lever connected to the chain, the main shoe pivoted to the hinge-piece M, and the gag-lever pivoted to the hinge-piece and arranged to act at one end against the shoe and at the opposite end against the arm $g'$, whereby the operation of the lifting-lever is caused first to effect the rocking motion of the shoe and finger-bar and thereafter the action of the gag-lever and the lifting of the cutting devices.

10. In a mower, and in combination with a hinge piece or support, the main shoe connected thereto by a horizontal pivot, the gag-lever mounted on the hinge-piece and arranged to act against the shoe, and a locking device, substantially as shown, adapted to fasten the gag-lever against the shoe at will, whereby the outer end of the finger-bar may be prevented from falling in relation to the shoe and hinge-piece.

11. In combination with the coupling-frame, the hinge-piece mounted thereon, the main shoe pivoted to the hinge-piece and provided with shoulder $l^2$, and the gag-lever pivoted to the hinge-piece adapted to engage said shoulder at one end and to engage the coupling-frame at the opposite end, whereby the gag-lever is caused to automatically lock the finger-bar in an upright position.

JOHN F. STEWARD.

Witnesses:
ARTHUR JOHNSON,
ARTHUR REDWANZ.